US012786239B2

(12) United States Patent
Belleschi et al.

(10) Patent No.: US 12,786,239 B2
(45) Date of Patent: Nov. 3, 2026

(54) SENDING AND RECEIVING A REPORT

(71) Applicant: Telefonaktiebolaget LM Ericsson (PUBL), Stockholm (SE)

(72) Inventors: Marco Belleschi, Solna (SE); Ali Parichehrehteroujeni, Linköping (SE); Pradeepa Ramachandra, Linköping (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 278 days.

(21) Appl. No.: 18/727,437

(22) PCT Filed: Nov. 29, 2022

(86) PCT No.: PCT/SE2022/051115
§ 371 (c)(1),
(2) Date: Jul. 9, 2024

(87) PCT Pub. No.: WO2023/136759
PCT Pub. Date: Jul. 20, 2023

(65) Prior Publication Data
US 2025/0097985 A1 Mar. 20, 2025

Related U.S. Application Data

(60) Provisional application No. 63/298,382, filed on Jan. 11, 2022.

(51) Int. Cl.

| | |
|---|---|
| ***H04L 9/40*** | (2022.01) |
| ***H04W 74/0833*** | (2024.01) |
| *H04W 74/0836* | (2024.01) |

(52) U.S. Cl.
CPC ......... *H04L 63/20* (2013.01); *H04W 74/0833* (2013.01); *H04W 74/0836* (2024.01)

(58) Field of Classification Search
None
See application file for complete search history.

(56) References Cited

U.S. PATENT DOCUMENTS

| | | | | |
|---|---|---|---|---|
| 2019/0150177 | A1 * | 5/2019 | Chen | H04W 72/1268 370/329 |
| 2022/0232607 | A1 * | 7/2022 | Fujishiro | H04W 72/1263 |
| 2023/0164804 | A1 * | 5/2023 | Xue | H04W 72/27 370/329 |

FOREIGN PATENT DOCUMENTS

| | | |
|---|---|---|
| WO | WO2021167519 A1 | 8/2021 |
| WO | WO2021203393 A1 | 10/2021 |

OTHER PUBLICATIONS

Notice of Reasons for Rejection issued for Japanese Patent Application Serial No. 2024-541753—Jul. 1, 2025.
3GPP TSG-RAN WG2 Meeting #111 electronic; Online, Aug. 17-28, 2020; Agenda Item: 8.13.2; Source: OPPO; Title: Enhancements and scope of R17 SON (R2-2007155).
(Continued)

*Primary Examiner* — Robert M Morlan
(74) *Attorney, Agent, or Firm* — Baker Botts L.L.P.

(57) ABSTRACT

Methods and apparatus are disclosed, including in some examples a method performed by a user equipment (UE) for sending a report. The method comprises sending a random access (RA) report to a network node, wherein the RA report includes an indication of a size of data in an uplink data buffer of the UE on initiation of a random access (RA) procedure performed by the UE.

18 Claims, 5 Drawing Sheets

200

(56) References Cited

OTHER PUBLICATIONS

3GPP TSG-RAN WG2 Meeting #111e; Online, Aug. 17-28, 2020; Agenda Item: 8.6.2; Source: Qualcomm Incorporated; Title: RACH based NR small data transmission (R2-2007540).
3GPP TSG RAN WG2#112-e; Electronic meeting, Nov. 2-13, 2020; Source: ZTE Corporation; Sanechips; Title: Enhanced UE reporting for 2step RA; Agenda Item: 8.13.2.2 (R2-2010322).
3GPP TSG-RAN WG2 Meeting #115 electronic; Online, Aug. 9-Aug. 27, 2021; Agenda item: 8.6.4; Source: FGI, Asia Pacific Telecom; Title: PDCCH monitoring in RA-SDT (R2-2107465).
3GPP TS 38.321 v16.7.0 (Dec. 2021) 3rd Generation Partnership Project; Technical Specification Group Radio Access Network; NR; Medium Access Control (MAC) protocol specification (Release 16).
PCT International Preliminary Report on Patentability issued for International application No. PCT/SE2022/051115—Dec. 6, 2023.
3GPP TSG-RAN WG2 Meeting #115 Electronic; Online, Aug. 16-27, 2021; Agenda Item: 8.13.2.2; Source: Nokia, Nokia Shanghai Bell; Title: Remaining Issues and New Aspects in 2-step NR UE RACH Report (R2-2107507 (R2-2105477)).
3GPP TSG-RAN WG2 #116bis-e; Electronic meeting, Jan. 16-25, 2022; Agenda Item: 8.13.2.1; Source: Ericsson; Title: Report of [Post116-e] [887.5] [SONMDT] Leftover issues on SON (Ericsson) (R2-2200005).
PCT Written Opinion of the International Searching Authority issued for International application No. PCT/SE2022/051115—Dec. 6, 2023.
3GPP TS 38.331 v16.4.1 (Mar. 2021) 3rd Generation Partnership Project; Technical Specification Group Radio Access Network; NR; Radio Resource Control (RRC) protocol specification (Release 16).

* cited by examiner

100

200

SENDING AND RECEIVING A REPORT

PRIORITY

This nonprovisional application is a U.S. National Stage Filing under 35 U.S.C. § 371 of International Patent Application Serial No. PCT/SE2022/051115 filed Nov. 29, 2022 and entitled "Sending and Receiving a Report" which claims priority to U.S. Provisional Patent Application No. 63/298,382 filed Jan. 11, 2022, both of which are hereby incorporated by reference in their entirety.

TECHNICAL FIELD

Example embodiments of this disclosure relate to sending and receiving a report, such as for example a random access (RA) report.

BACKGROUND

In some wireless communication networks, a Random Access Channel (RACH) configuration may have a critical impact on user experience and overall network performance. The RACH collision probability, and therefore access setup delays, data resuming delays from the UL unsynchronized state, handover delays, transition delays from RRC_INACTIVE, and beam failure recovery delays, are all affected by the RACH configuration. In addition, performing RACH based on the most suitable downlink beam is also important and will avoid unnecessary power ramping and failed RACH access attempts. This is beneficial both for the network as well as for the device attempting RACH access; it may avoid unnecessary interference in the network, and also reduce the experienced delay and device energy consumption. In New Radio (NR), a new feature allows a device such as a User Equipment (UE) to change a RACH resource during a RACH procedure, which leads to more complex behaviour.

The setting of RACH parameters depends on a multitude of factors, such as:

- the uplink inter-cell interference from the Physical Uplink Shared Channel (PUSCH),
- RACH load (call arrival rate, HO rate, tracking area update, RRC_Inactive transition rate, the request for Other SI, the beam failure recovery, traffic pattern and population under the cell coverage as it affects the UL synchronization states and hence the need to use random access),
- uplink (UL) and supplementary uplink (SUL) imbalances,
- PUSCH load,
- the cubic metric of the preambles allocated to a cell,
- whether the cell is in high-speed mode or not,
- uplink (UL) and downlink (DL) imbalances.

The targets of RACH optimization are as follows:

- Minimize access delays for UEs under the coverage of popular Synchronization Signal Blocks (SSBs),
- Minimize the delays for UEs to request System Information (SI) other than broadcast SI,
- Minimize the imbalance of UE access delays on uplink (UL) and supplementary uplink (SUL) channels,
- Minimize beam failure recovery delays for UEs in RRC_Connected state,
- Minimize failed/unnecessary RACH attempts on RACH resources before success.

Consequently, the RACH optimization function will attempt to automatically set several parameters related to the performance of RACH. Automatic RACH parameter settings can be enabled by collecting a RACH report from a UE and by PRACH parameters exchange between gNodeBs (gNBs). The mechanism and content of information report/exchange for RACH optimization in Long Term Evolution (LTE) could be used as a baseline while taking NR new features, e.g. beams and SUL, into account.

The setting of RACH parameters that can be optimized are:

- RACH configuration (resource unit allocation);
- RACH preamble split (among dedicated, group A, group B);
- RACH backoff parameter value;
- RACH transmission power control parameters.

As a minimum, RACH optimization is realized by a UE providing a RACH related information report to a Next Generation (NG)-Radio Access Network (RAN) node, and by exchange of Physical RACH (PRACH) configuration of normal UL carrier and SUL carrier between NG-RAN nodes.

For Control Unit-Distributed Unit (CU-DU) architecture, a gNB-DU should be allowed to report its RACH configuration per cell to the gNB-CU, and the gNB-CU should be allowed to signal the RACH configuration per served cell to neighbouring NG-RAN nodes. This allows NG-RAN nodes to identify whether RACH configurations of neighbouring cells are optimized or whether changes are needed in order to achieve a better RACH coordination between neighbouring cells.

Upon receiving a polling message requesting a RACH report, e.g. a UE Information Request message, from the NG-RAN node (potentially gNB-CU of the current serving cell), UE reports RACH information within a UE Information Response message. The gNB-CU and gNB-DU take into account the RACH report and other node information, to achieve an optimized RACH configuration.

The contents of the RACH information report comprises the following:

- Indexes of the SSBs and number of RACH preambles sent on each attempted SSB listed in chronological order of attempts
- The frequency (NR absolute radio frequency channel number, ARFCN) of attempted SSBs
- The beam quality of each attempted SSB (i.e. beam level measurement during RACH attempts such as beam reference signal received power, BRSRP, beam reference signal received quality, BRSRQ, beam signal to interference and noise ratio, BSINR)
- Indication whether the selected SSB is above or below the rsrp-ThresholdSSB threshold
- Elapsed time from the last measurement prior to the beam selection time
- Number of RACH preambles sent on SUL Number of RACH preambles sent on NUL (Normal UpLink or Non supplementary UpLink)
- Total number of fallbacks between Contention Based RACH Access (CBRA) and Contention Free RACH Access (CFRA) Contention detection indication The above RACH information report should also apply to the secondary node (SN) for the Multi Radio Access Technology (RAT)-Dual Connectivity (MR-DC) case.

The report of RACH information when a random access procedure is performed may be requested by the network via the UE Information procedure in RRC (section 5.7.10.3 of 3GPP TS 38.331 v 16.4.1), in the case where a RACH procedure was successful. Further, what information is included by the UE in the RA report is specified in section 5.7.10.5 of 3GPP TS 38.331 v 16.4.1.

A buffer status report (BSR) is defined to report the buffered data size for uplink transmission in the UE side. The buffer status is reported per logical channel group (LCG). In NR, there are up to 8 LCGs. There are 3 types of BSR defined in Section 5.4.5 of 3GPP TS 38.321 V16.7.0: regular BSR, periodic BSR and padding BSR.

SUMMARY

One aspect of the present disclosure provides a method performed by a user equipment (UE) for sending a report. The method comprises sending a random access (RA) report to a network node, wherein the RA report includes an indication of a size of data in an uplink data buffer of the UE on initiation of a random access (RA) procedure performed by the UE.

Another aspect of the present disclosure provides a method performed by a network node for receiving a report. The method comprises receiving a random access (RA) report from a User Equipment (UE), wherein the RA report includes an indication of a size of data in an uplink data buffer of the UE on initiation of a random access (RA) procedure performed by the UE.

A further aspect of the present disclosure provides a user equipment (UE) for sending a report. The UE comprises a processor and a memory. The memory contains instructions executable by the processor such that the UE is operable to send a random access (RA) report to a network node, wherein the RA report includes an indication of a size of data in an uplink data buffer of the UE on initiation of a random access (RA) procedure performed by the UE.

A still further aspect of the present disclosure provides a network node for receiving a report. The network node comprises a processor and a memory. The memory contains instructions executable by the processor such that the network node is operable to receive a random access (RA) report from a User Equipment (UE), wherein the RA report includes an indication of a size of data in an uplink data buffer of the UE on initiation of a random access (RA) procedure performed by the UE.

An additional aspect of the present disclosure provides a user equipment (UE) for sending a report. The UE is configured to send a random access (RA) report to a network node, wherein the RA report includes an indication of a size of data in an uplink data buffer of the UE on initiation of a random access (RA) procedure performed by the UE.

A further aspect of the present disclosure provides a network node for receiving a report. The network node is configured to receive a random access (RA) report from a User Equipment (UE), wherein the RA report includes an indication of a size of data in an uplink data buffer of the UE on initiation of a random access (RA) procedure performed by the UE.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
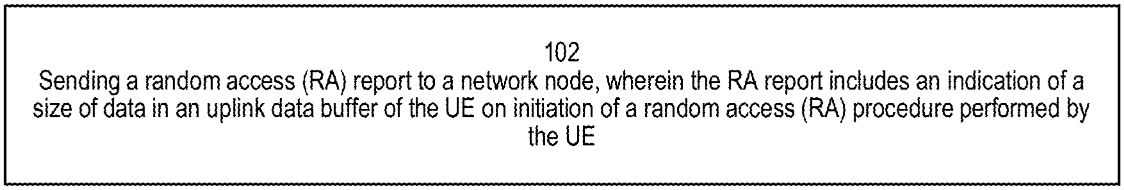
FIG. 1 depicts a method performed by a user equipment (UE) for sending a report in accordance with particular embodiments.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g. analog and/or discrete logic gates interconnected to perform a specialized function, Application Specific Integrated Circuits (ASICs), Programmable Logic Arrays (PLAs), etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g. digital or analogue) circuitry including but not limited to application specific integrated circuit(s) (ASIC) and/or field programmable gate array(s) (FPGA(s)), and (where appropriate) state machines capable of performing such functions.

There currently exist certain challenge(s). For example, during the RAN2 #116 meeting, it was agreed to introduce MsgA Physical Uplink Shared Channel (PUSCH) resource-related information in a 2-step random access (RA) report and details within the following information: the payload size transmitted in MSGA for a 2-step RACH attempt.

Further, during "[Post116-e][887_5][SONMDT] Leftover issues on SON (Ericsson)—R2-2200005' an email discussion relating to R2-2200005, "Leftover issues on SON (Ericsson)," the inclusion of the payload size without padding was preferred.

The format of the how to report the msgA size was also discussed, and it was preferred to report the msgA size as indicating one of a plurality of ranges which uses up to 3 bits. This has some limitations.

For example, this does not provide enough information to the network to optimize for msgA PUSCH resource allocation. This provides information for msgA PUSCH allocation optimization only for the scenario when the UE wants to transmit 'X' bytes and the network had allocated more resources than what was required to transmit 'X' bytes. However, the above methods do not cover the scenario when the UE wanted to transmit 'X' bytes but the network had allocated msgA PUSCH resources which were not sufficient to transmit 'X' bytes.

Certain aspects of the disclosure and their embodiments may provide solutions to these or other challenges. For example, examples of this disclosure propose a method performed by the UE for indicating the uplink data size associated to msgA transmission in the RA report. Based on the method the UE includes the uplink data size to be the value of the overall buffer size at the start of the 2 step RA procedure initialization.

For example, an example method of this disclosure performed by a UE may aid the PUSCH allocation associated to the msgA by the network node. In this example the method includes:

- Identifying that a msgA needs to be transmitted based on the arrival of uplink data of size 'X' for transmission at the MAC layer;
- Performing the 2 step random access (RA) procedure towards a network node;
- Upon successful completion of the 2 step RA procedure, including 'X' as the size of the UL data in a RA report; and
- Upon request from the network node, transmitting the RA report Certain embodiments of this disclosure may provide one or more of the following technical advantage(s). For example, methods proposed herein may provide sufficient information from the UE to the network for optimizing the allocation of PUSCH resources associated to the msgA transmission, especially when the UE wants to transmit a size of data that is not possible to fit within the PUSCH resources allocated for the msgA transmission by the network.

Some of the embodiments contemplated herein will now be described more fully with reference to the accompanying drawings. Embodiments are provided by way of example to convey the scope of the subject matter to those skilled in the art. Additional information may also be found in the document(s) provided in the Appendix.

FIG. 1 depicts a method 100 performed by a user equipment (UE) for sending a report in accordance with particular embodiments. The method 100 may be performed by a UE or wireless device (e.g. the UE QQ112 or UE QQ200 as described later with reference to FIGS. 3 and 4 respectively). The method 100 begins at step 102 with sending a random access (RA) report to a network node, wherein the RA report includes an indication of a size of data in an uplink data buffer of the UE on initiation of a random access (RA) procedure performed by the UE. The RA procedure may comprise in some examples a 2-step RA procedure. The network node may be for example a base station, base station control unit (CU), base station distributed unit (DU), eNB, eNB-CU, eNB-DU, gNB, gNB-CU or gNB-DU.

In some examples, the indication of the size of the data in the uplink buffer comprises an indication of one of a plurality of predetermined ranges for the size of the data. For example, the indication may be a 3 bit field that takes one of 8 possible values. These may include, for example, that the size of the data in the UL buffer is within a first range, a second range, a third range, a fourth range, or is zero. Two values may be unused or reserved in this example. The ranges may be non-overlapping in some examples. In some examples, the indication of one of the plurality of predetermined ranges for the size of the data may be an indication of an index in a table, wherein for example the value (or range) in the entry in the table corresponding to the index may correspond to the value (or range) of the size of the data in the UL buffer.

The indication of the size of the data in the uplink data buffer may comprise in some examples an indication of a sum of a size of uplink data transmitted in a physical uplink shared channel (PUSCH) transmission associated with the RA procedure and a size of data remaining in the uplink data buffer after completion of the RA procedure. In some examples, the PUCH transmission associated with the RA procedure comprises a PUSCH transmission transmitted in PUSCH resources allocated to the UE in the RA procedure.

In some examples, the RA report includes an indication of a ratio of the size of the data in the uplink data buffer to a size of data remaining in the uplink data buffer after completion of the RA procedure.

The RA report includes, in some examples, an indication of a ratio of a size of uplink data transmitted in a physical uplink shared channel (PUSCH) transmission associated with the RA procedure to a sum of a size of uplink data transmitted in a physical uplink shared channel (PUSCH) transmission associated with the RA procedure and a size of data remaining in the uplink data buffer after completion of the RA procedure. Additionally or alternatively, in some examples, the RA report includes an indication of a ratio of a size of uplink data remaining in a buffer of the UE after completion of the RA procedure to a sum of a size of uplink data transmitted in a physical uplink shared channel (PUSCH) transmission associated with the RA procedure and a size of data remaining in the uplink data buffer after completion of the RA procedure. Additionally or alternatively, in some examples, the RA report includes an indication of a ratio of a size of uplink data successfully transmitted in a physical uplink shared channel (PUSCH) transmission associated with the RA procedure to a size of uplink data transmitted in the PUSCH transmission.

The method 100 may comprise, in some examples, receiving a request for a RA report from the network node before sending the RA report to the network node. The request may be a UE information request message in some examples. The RA report may comprised in a UE Information Response message in some examples, which in some examples be sent in response to the request from the network node.

In some examples, the RA procedure comprises a successful RA procedure.

Figure 2:
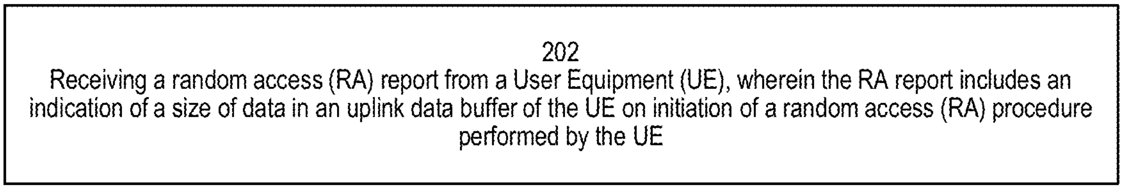
FIG. 2 depicts a method performed by a network node for receiving a report in accordance with particular embodiments.

FIG. 2 depicts a method 200 performed by a network node for receiving a report in accordance with particular embodiments. The method 200 may be performed by a network node (e.g. the network node QQ110 or network node QQ300 as described later with reference to FIGS. 3 and 5 respectively). The method 200 begins at step 202 with receiving a random access (RA) report from a User Equipment (UE), wherein the RA report includes an indication of a size of data in an uplink data buffer of the UE on initiation of a random access (RA) procedure performed by the UE. The RA procedure may comprise in some examples a 2-step RA procedure. The network node may be for example a base station, base station control unit (CU), base station distributed unit (DU), eNB, eNB-CU, eNB-DU, gNB, gNB-CU or gNB-DU.

The indication of the size of the data in the uplink data buffer may in some examples comprise an indication of one of a plurality of predetermined ranges for the size of the data, as suggested above for the method 100 of FIG. 1. In some examples, the indication of one of the plurality of predetermined ranges for the size of the data comprises an indication of an index in a table.

In some examples, the indication of the size of the data in the uplink buffer comprises an indication of a sum of a size of uplink data transmitted in a physical uplink shared channel (PUSCH) transmission associated with the RA procedure and a size of data remaining in the uplink buffer after completion of the RA procedure. The PUCH transmission associated with the RA procedure may be for example a PUSCH transmission transmitted in PUSCH resources allocated to the UE in the RA procedure.

The RA report, in some examples, includes an indication of a ratio of the size of the data in the uplink data buffer to a size of data remaining in the uplink data buffer after completion of the RA procedure. Additionally or alternatively, in some examples, the RA report includes an indication of a ratio of a size of uplink data transmitted in a physical uplink shared channel (PUSCH) transmission associated with the RA procedure to a sum of a size of uplink data transmitted in a physical uplink shared channel (PUSCH) transmission associated with the RA procedure and a size of a size of data remaining in the uplink data buffer after completion of the RA procedure. Additionally or alternatively, in some examples, the RA report includes an indication of a ratio of a size of uplink data remaining in a buffer of the UE after completion of the RA procedure to a sum of a size of uplink data transmitted in a physical uplink shared channel (PUSCH) transmission associated with the RA procedure and a size of data remaining in the uplink data buffer after completion of the RA procedure. Additionally or alternatively, in some examples, the RA report includes an indication of a ratio of a size of uplink data successfully transmitted in a physical uplink shared channel (PUSCH) transmission associated with the RA procedure to a size of uplink data transmitted in the PUSCH transmission.

The method 200 may in some examples comprise sending a request for a RA report to the UE before receiving the RA report from the UE.

In some examples, the RA procedure comprises a successful RA procedure.

The method 200 may in some examples comprise adapting one or more parameters for a random access channel (RACH) and/or a physical uplink shared channel (PUSCH) for one or more further RA procedures for the UE and/or one or more other UEs based on the indication of the size of the data in the uplink data buffer. Adapting the one or more parameters may comprise for example allocating an amount of PUSCH resources for one or more further RA procedures by the UE and/or one or more other UEs. Additionally or alternatively, adapting the one or more parameters may comprise for example selecting a modulation and coding scheme (MCS) for one or more further RA procedures by the UE and/or one or more other UEs.

The method may also in some examples comprise adapting the one or more parameters based further on a ratio of a size of uplink data successfully transmitted in a physical uplink shared channel (PUSCH) transmission associated with the RA procedure and/or one or more other RA procedures by the UE and/or one or more other UEs to a size of uplink data transmitted in the PUSCH transmission.

In this disclosure, the terms payload size, size of UL data and BSR value are used. The following provides a high-level definition (their intended meaning) of these terms.

- The term ‘payload size’ refers to the size of the payload without including any added padding that is transmitted in the msgA.
- The term ‘BSR value’ refers to the buffer status as indicated in the BSR MAC CE.
- The term ‘size of UL data’ refers to the amount (or size) of data that is present in the UE’s uplink (UL) buffer at the time of initiating the random access (RA) procedure, e.g. Size of UL data=payload size+BSR value. The term ‘overall buffer size’ also refers to the same.

Particular example embodiments of the above-described general concepts will now be described for illustrative purposes.

As indicated above, example embodiments provide a method to be performed by the UE for indicating the size of the UL data at the time of initiating the random access (RA) procedure. This information is then used by the network to optimize the allocation of the PUSCH resources associated to the msgA.

In one example embodiment, the UE includes the ‘Size of UL data’ as a single value in the RA report. In some embodiments, the UE encodes the ‘Size of UL data’ using an explicit value i.e., actual byte size in integer format. An example implementation is given below as ASN.1 code. In this example, the UE includes the attribute “ulDataSize” (underlined to highlight it) to represent the sum of the amount of data that is transmitted using the PUSCH resources associated to the msgA of the 2 step RA procedure and the amount of data that is remaining in the buffer (BSR value) at the time of completing the 2 step RA procedure. The value ‘81338368’ is just a non-limiting example maximum value.

```
RA-InformationCommon-r16 ::=            SEQUENCE {
   absoluteFrequencyPointA-r16             ARFCN-ValueNR,
   locationAndBandwidth-r16                INTEGER (0..37949),
   subcarrierSpacing-r16                   SubcarrierSpacing,
   msg1-FrequencyStart-r16                 INTEGER (0..maxNrofPhysicalResourceBlocks–
1)       OPTIONAL,
   msg1-FrequencyStartCFRA-r16             INTEGER (0..maxNrofPhysicalResourceBlocks–
1)       OPTIONAL,
   msg1-SubcarrierSpacing-r16              SubcarrierSpacing
OPTIONAL,
   msg1-SubcarrierSpacingCFRA-r16          SubcarrierSpacing
OPTIONAL,
   msg1-FDM-r16                            ENUMERATED {one, two, four, eight}
OPTIONAL,
   msg1-FDMCFRA-r16                        ENUMERATED {one, two, four, eight}
OPTIONAL,
   perRAInfoList-r16                       PerRAInfoList-r16,
   ...,
   [[
   perRAInfoListExt-v1660                  PerRAInfoListExt-v1660
```

-continued

```
OPTIONAL
   ]],
   [[
   msgA-RO-FrequencyStart-r17                 INTEGER
(0..maxNrofPhysicalResourceBlocks−1)        OPTIONAL,
   msgA-RO-FrequencyStartCFRA-r17            INTEGER (0..maxNrofPhysicalResourceBlocks−
1)          OPTIONAL,
   msgA-SubcarrierSpacing-r17                SubcarrierSpacing
OPTIONAL,
   msgA-RO-FDM-r17                           ENUMERATED {one, two, four, eight}
OPTIONAL,
   msgA-RO-FDMCFRA-r17                       ENUMERATED {one, two, four, eight}
OPTIONAL,
   msgA-TransMax-r17                           ENUMERATED {n1, n2, n4, n6, n8, n10, n20,
n50, n100, n200} OPTIONAL,
   dlPathlossRSRP-r17                        RSRP-Range
OPTIONAL,
   intendedSIBs-r17                          SEQUENCE (SIZE (1..maxSIB) ) OF SIB-Type-
r17        OPTIONAL,
   ssbsForSI-Acquisition-r17                 SEQUENCE (SIZE (1..maxNrofSSBs) ) OF SSB-
Index            OPTIONAL,
   ulDataSize-r17                   INTEGER (0.. 81338368) OPTIONAL
   ]]
}
```

In some embodiments, the UE encodes the 'payload size' (or size/amount of uplink data in the uplink data buffer) using the same format as that of Buffer Status Report (BSR) Medium Access Control (MAC) Control Elements (CEs) as captured in Table 6.1.3.1-1 or 6.1.3.1-2 of 3GPP TS 38.321 v16.7.0. An example implementation is given below as ASN.1 code. In this example, the UE includes ulDataSize to represent the sum of the amount of that is transmitted using the PUSCH resources associated to the msgA of the 2 step RA procedure and the amount of data that is remaining in the buffer (BSR value) at the time of completing the 2 step RA procedure. The example uses the 8-bit BSR MAC CE related encoding as provided in 6.1.3.1-2 of 3GPP TS 38.321 v16.7.0. Here, if the UE includes the value '0', then the UE did not transmit any data, if the UE includes the value '1', then the UE included up to 10 bytes of data, if the UE includes the value '2', then the UE included up to 14 bytes of data, etc. as per table 6.1.3.1-2 of 3GPP TS 38.321 v16.7.0.

```
RA-InformationCommon-r16 ::=          SEQUENCE {
   absoluteFrequencyPointA-r16                        ARFCN-ValueNR,
   locationAndBandwidth-r16                           INTEGER (0..37949),
   subcarrierSpacing-r16                              SubcarrierSpacing,
   msg1-FrequencyStart-r16                            INTEGER (0..maxNrofPhysicalResourceBlocks−
1)      OPTIONAL,
   msg1-FrequencyStartCFRA-r16                        INTEGER (0..maxNrofPhysicalResourceBlocks−
1)      OPTIONAL,
   msg1-SubcarrierSpacing-r16                         SubcarrierSpacing
OPTIONAL,
   msg1-SubcarrierSpacingCFRA-r16                     SubcarrierSpacing
OPTIONAL,
   msg1-FDM-r16                                       ENUMERATED {one, two, four, eight}
OPTIONAL,
   msg1-FDMCFRA-r16                                   ENUMERATED {one, two, four, eight}
OPTIONAL,
   perRAInfoList-r16                                  PerRAInfoList-r16,
   ...,
   [[
   perRAInfoListExt-v1660                             PerRAInfoListExt-v1660
OPTIONAL
   ]],
   [[
   msgA-RO-FrequencyStart-r17                           INTEGER
(0..maxNrofPhysicalResourceBlocks−1)                  OPTIONAL,
   msgA-RO-FrequencyStartCFRA-r17                     INTEGER (0..maxNrofPhysicalResourceBlocks−
1)                              OPTIONAL,
   msgA-SubcarrierSpacing-r17                         SubcarrierSpacing
OPTIONAL,
   msgA-RO-FDM-r17                                    ENUMERATED {one, two, four, eight}
OPTIONAL,
   msgA-RO-FDMCFRA-r17                                ENUMERATED {one, two, four, eight}
OPTIONAL,
   msgA-TransMax-r17                                    ENUMERATED {n1, n2, n4, n6, n8, n10, n20,
n50, n100, n200} OPTIONAL,
   dlPathlossRSRP-r17                                 RSRP-Range
OPTIONAL,
   intendedSIBs-r17                                   SEQUENCE (SIZE (1..maxSIB) ) OF SIB-Type-
```

-continued

```
r17           OPTIONAL,
  ssbsForSI-Acquisition-r17                     SEQUENCE (SIZE (1..maxNrofSSBs) ) OF SSB-
Index         OPTIONAL,
  ulDataSize-r17          INTEGER (0.. 255) OPTIONAL
  ]]
```

In another example embodiment, the UE includes the ‘payload size’ and ‘BSR value’ as individual values in the RA report so that the network can sum them up to derive the ‘Size of UL data’ (e.g. in the UL data buffer) as the sum of ‘payload size’ and the ‘BSR value’.

In some embodiments, the RA report contains the ‘BSR value’ indication encoded using a single 5 bit index value as indicated in Table 6.1.3.1-1 of 3GPP TS 38.321 v16.7.0 when the UE uses the Short BSR format or Short truncated BSR format to report the BSR MAC CE. An example implementation is given below as ASN.1 code. In this example, the UE includes the (underlined) bsr5bitValue to represent the amount of data in the buffer that is yet to be transmitted at the time of successful completion of the 2 step RA procedure.

In some embodiments, the RA report contains the ‘BSR value’ indication per logical channel group and this value is the index of buffer size level as indicated in Table 6.1.3.1 of 3GPP TS 38.321 v16.7.0.

When in some examples the UE uses the Short BSR format or Short truncated BSR format to report the BSR MAC CE, then the UE may use the 5-bit format, as included in Table 6.1.3.1-1 of 3GPP TS 38.321 v16.7.0, to include the ‘BSR value’ indication in the RA report.

An example implementation may be the same as the previous implementation above. In this example, the UE includes the bsr5bitValue to represent the amount of data in the buffer that is yet to be transmitted at the time of successful completion of the 2 step RA procedure.

When in some examples the UE uses the Long BSR format or Long truncated BSR format to report the BSR

```
RA-InformationCommon-r16 ::=          SEQUENCE {
  absoluteFrequencyPointA-r16           ARFCN-ValueNR,
  locationAndBandwidth-r16              INTEGER (0..37949),
  subcarrierSpacing-r16                 SubcarrierSpacing,
  msg1-FrequencyStart-r16               INTEGER (0..maxNrofPhysicalResourceBlocks−
1)            OPTIONAL,
  msg1-FrequencyStartCFRA-r16           INTEGER (0..maxNrofPhysicalResourceBlocks−
1)            OPTIONAL,
  msg1-SubcarrierSpacing-r16            SubcarrierSpacing
OPTIONAL,
  msg1-SubcarrierSpacingCFRA-r16        SubcarrierSpacing
OPTIONAL,
  msg1-FDM-r16                          ENUMERATED {one, two, four, eight}
OPTIONAL,
  msg1-FDMCFRA-r16                      ENUMERATED {one, two, four, eight}
OPTIONAL,
  perRAInfoList-r16                     PerRAInfoList-r16,
  ...,
  [[
  perRAInfoListExt-v1660                PerRAInfoListExt-v1660
OPTIONAL
  ]],
  [[
  msgA-RO-FrequencyStart-r17              INTEGER
(0..maxNrofPhysicalResourceBlocks−1)    OPTIONAL,
  msgA-RO-FrequencyStartCFRA-r17        INTEGER (0..maxNrofPhysicalResourceBlocks−
1)            OPTIONAL,
  msgA-SubcarrierSpacing-r17            SubcarrierSpacing
OPTIONAL,
  msgA-RO-FDM-r17                       ENUMERATED {one, two, four, eight}
OPTIONAL,
  msgA-RO-FDMCFRA-r17                   ENUMERATED {one, two, four, eight}
OPTIONAL,
  msgA-TransMax-r17                       ENUMERATED {n1, n2, n4, n6, n8, n10, n20,
n50, n100, n200} OPTIONAL,
  dlPathlossRSRP-r17                    RSRP-Range
OPTIONAL,
  intendedSIBs-r17                      SEQUENCE (SIZE (1..maxSIB) ) OF SIB-Type-
r17           OPTIONAL,
  ssbsForSI-Acquisition-r17             SEQUENCE (SIZE (1..maxNrofSSBs) ) OF SSB-
Index         OPTIONAL,
  bsrValue-r17                CHOICE {
    bsr5bitValue              INTEGER (0..31)
    bsr8bitValue              INTEGER (0..255)
  } OPTIONAL
  ]]
}
```

MAC CE, then the UE uses the 8-bit format, as included in Table 6.1.3.1-2 of 3GPP TS 38.321 v16.7.0, to include the 'BSR value' indication in the RA report. An example implementation may be the same as the previous implementation above. In this example, the UE includes the bsr8bitValue to represent the amount of data in the buffer that is yet to be transmitted at the time of successful completion of the 2 step RA procedure.

In some embodiments, the RA report contains the 'BSR value' indication encoded using a single 8-bit format as indicated in Table 6.1.3.1-2 of 3GPP TS 38.321 v16.7.0 when the UE uses the Long BSR format or Long truncated BSR format to report the BSR MAC CE. In this case, if the BSR MAC CE was including multiple logical channel groups, then the 'BSR value' is calculated based on the index derived from the sum of the individual logical channel group related BS values in table 6.1.3.1-2 of 3GPP TS 38.321 v16.7.0. For example, if the UE includes a BSR MAC CE that indicates LCG-0 and LCG-1 to indicate buffer sizes of index-10 (actual buffer size of 19) and index-4 (actual buffer size of 13), then the 'BSR value' reported in the RA report would be index-18 (actual buffer size of <=32 which is the sum of 19+13). An example implementation may be the same as the previous implementation above. In this example, the UE includes the bsr8bitValue to represent the amount of data in the buffer that is yet to be transmitted at the time of successful completion of the 2 step RA procedure.

In some embodiments, the UE encodes the 'payload size' using an explicit value of the actual payload included in the msgA, i.e., actual byte size in integer format. An example implementation is given below as ASN.1 code. In this example, the UE includes the (underlined) payloadSize to represent the amount of data in the buffer that is transmitted using the PUSCH resources associated to the msgA of the 2 step RA procedure. The value '81338368' is an example maximum value based on the BSR MAC CE.

```
RA-InformationCommon-r16 ::=                SEQUENCE {
   absoluteFrequencyPointA-r16                 ARFCN-ValueNR,
   locationAndBandwidth-r16                    INTEGER (0..37949),
   subcarrierSpacing-r16                       SubcarrierSpacing,
   msg1-FrequencyStart-r16                     INTEGER (0..maxNrofPhysicalResourceBlocks-
1)            OPTIONAL,
   msg1-FrequencyStartCFRA-r16                 INTEGER (0..maxNrofPhysicalResourceBlocks-
1)            OPTIONAL,
   msg1-SubcarrierSpacing-r16                  SubcarrierSpacing
OPTIONAL,
   msg1-SubcarrierSpacingCFRA-r16              SubcarrierSpacing
OPTIONAL,
   msg1-FDM-r16                                ENUMERATED {one, two, four, eight}
OPTIONAL,
   msg1-FDMCFRA-r16                            ENUMERATED {one, two, four, eight}
OPTIONAL,
   perRAInfoList-r16                           PerRAInfoList-r16,
   ...,
   [[
   perRAInfoListExt-v1660                      PerRAInfoListExt-v1660
OPTIONAL
   ]],
   [[
   msgA-RO-FrequencyStart-r17                    INTEGER
(0..maxNrofPhysicalResourceBlocks-1)           OPTIONAL,
   msgA-RO-FrequencyStartCFRA-r17              INTEGER (0..maxNrofPhysicalResourceBlocks-
1)            OPTIONAL,
   msgA-SubcarrierSpacing-r17                  SubcarrierSpacing
OPTIONAL,
   msgA-RO-FDM-r17                             ENUMERATED {one, two, four, eight}
OPTIONAL,
   msgA-RO-FDMCFRA-r17                         ENUMERATED {one, two, four, eight}
OPTIONAL,
   msgA-TransMax-r17                             ENUMERATED {n1, n2, n4, n6, n8, n10, n20,
n50, n100, n200} OPTIONAL,
   dlPathlossRSRP-r17                          RSRP-Range
OPTIONAL,
   intendedSIBs-r17                            SEQUENCE (SIZE (1..maxSIB) ) OF SIB-Type-
r17           OPTIONAL,
   ssbsForSI-Acquisition-r17                   SEQUENCE (SIZE (1..maxNrofSSBs) ) OF SSB-
Index         OPTIONAL,
   payloadSize-r17                 INTEGER (0.. 81338368) OPTIONAL
   ]]
}
```

In some embodiments, the UE encodes the 'payload size' using the same format as that of the BSR MAC CEs as captured in Table 6.1.3.1-1 or 6.1.3.1-2 of 3GPP TS 38.321 v16.7.0. An example implementation is given below as ASN.1 code. In this example, the UE includes the (underlined) payloadSize to represent the amount of data in the buffer that is transmitted using the PUSCH resources associated to the msgA of the 2 step RA procedure. The example uses the 8-bit BSR MAC CE related encoding as provided in 6.1.3.1-2 of 3GPP TS 38.321 v16.7.0. Here, if the UE includes the value '0', then the UE did not transmit any data, if the UE includes the value '1', then the UE included up to 10 bytes of data, if the UE includes the value '2' then the UE included up to 14 bytes of data, etc. as per table 6.1.3.1-2 of 3GPP TS 38.321 v16.7.0.

```
RA-InformationCommon-r16 ::=            SEQUENCE {
   absoluteFrequencyPointA-r16            ARFCN-ValueNR,
   locationAndBandwidth-r16               INTEGER (0..37949) ,
   subcarrierSpacing-r16                  SubcarrierSpacing,
   msg1-FrequencyStart-r16                INTEGER (0..maxNrofPhysicalResourceBlocks–
1)          OPTIONAL,
   msg1-FrequencyStartCFRA-r16            INTEGER (0..maxNrofPhysicalResourceBlocks–
1)          OPTIONAL,
   msg1-SubcarrierSpacing-r16             SubcarrierSpacing
OPTIONAL,
   msg1-SubcarrierSpacingCFRA-r16         SubcarrierSpacing
OPTIONAL,
   msg1-FDM-r16                           ENUMERATED {one, two, four, eight}
OPTIONAL,
   msg1-FDMCFRA-r16                       ENUMERATED {one, two, four, eight}
OPTIONAL,
   perRAInfoList-r16                      PerRAInfoList-r16,
   ...,
   [[
   perRAInfoListExt-v1660                 PerRAInfoListExt-v1660
OPTIONAL
   ]],
   [[
   msgA-RO-FrequencyStart-r17               INTEGER
(0..maxNrofPhysicalResourceBlocks–1)      OPTIONAL,
   msgA-RO-FrequencyStartCFRA-r17         INTEGER (0..maxNrofPhysicalResourceBlocks–
1)          OPTIONAL,
   msgA-SubcarrierSpacing-r17             SubcarrierSpacing
OPTIONAL,
   msgA-RO-FDM-r17                        ENUMERATED {one, two, four, eight}
OPTIONAL,
   msgA-RO-FDMCFRA-r17                    ENUMERATED {one, two, four, eight}
OPTIONAL,
   msgA-TransMax-r17                        ENUMERATED {n1, n2, n4, n6, n8, n10, n20,
n50, n100, n200} OPTIONAL,
   dlPathlossRSRP-r17                     RSRP-Range
OPTIONAL,
   intendedSIBs-r17                       SEQUENCE (SIZE (1..maxSIB) ) OF SIB-Type-
r17          OPTIONAL,
   ssbsForSI-Acquisition-r17              SEQUENCE (SIZE (1..maxNrofSSBs) ) OF SSB-
Index        OPTIONAL,
   payloadSize-r17               INTEGER (0.. 255) OPTIONAL
   ]]
}
```

In another example embodiment, the UE includes the 'Size of UL data', 'payload size' and 'BSR'. The methods to encode or include them can be one or more of the methods described above.

In yet another example embodiment, the UE includes the percentage of the packets that where correctly delivered to the network as part of the msgA PUSCH transmission compared to the entire uplink data that was available for transmission at the time of initiating the 2 step RA procedure.

In yet another example embodiment the UE includes the percentage of the packets that where correctly delivered to the network compared to the entire uplink data that has been transmitted as part of msgA payload. In some embodiments, the UE uses HARQ mechanism and the amount of the ACKed messages received upon transmission of uplink data to calculate the percentage of the successful data transmission transmitted as part of msgA payload.

Examples of this disclosure also include network implemented methods as follows.

In an example, upon receiving the Size of UL data related information in RA reports from multiple UEs, the network can take one or more of the following actions.

If the average Size of UL data indicated by the UEs in RA reports is very small, then the network node can reduce the PUSCH resources allocated for the msgA transmission or the network can decrease the maximum MCS value associated to the msgA transmission etc. Here, the term 'very small' may refer for example to the scenario wherein the estimated resources required for transmitting the average Size of UL data is (much) smaller than the actual allocated PUSCH resources for the msgA transmission.

If the median Size of UL data that is transmitted by the UEs is very small, then the network node can reduce the PUSCH resources allocated for the msgA transmission or the network can decrease the maximum MCS value associated to the msgA transmission etc. Here, the term 'very small' may refer for example to the scenario wherein the estimated resources required for transmitting the median Size of UL data is (much) smaller than the actual allocated PUSCH resources for the msgA transmission.

If the average Size of UL data that is transmitted by the UEs is very large, then the network node can increase the PUSCH resources allocated for the msgA transmission or the network can increase the maximum MCS value associated to the msgA transmission etc. Here, the term 'very large' may refer for example to the scenario wherein the estimated resources required for transmitting the average Size of UL data is (much) larger than the actual allocated PUSCH resources for the msgA transmission.

If the median Size of UL data that is transmitted by the UEs is very large, then the network node can increase the PUSCH resources allocated for the msgA transmission or the network can increase the maximum MCS value associated to the msgA transmission etc. Here, The term 'very small' may refer for example to the scenario wherein the estimated resources required for transmitting the median Size of UL data is (much) larger than the actual allocated PUSCH resources for the msgA transmission.

Figure 3:
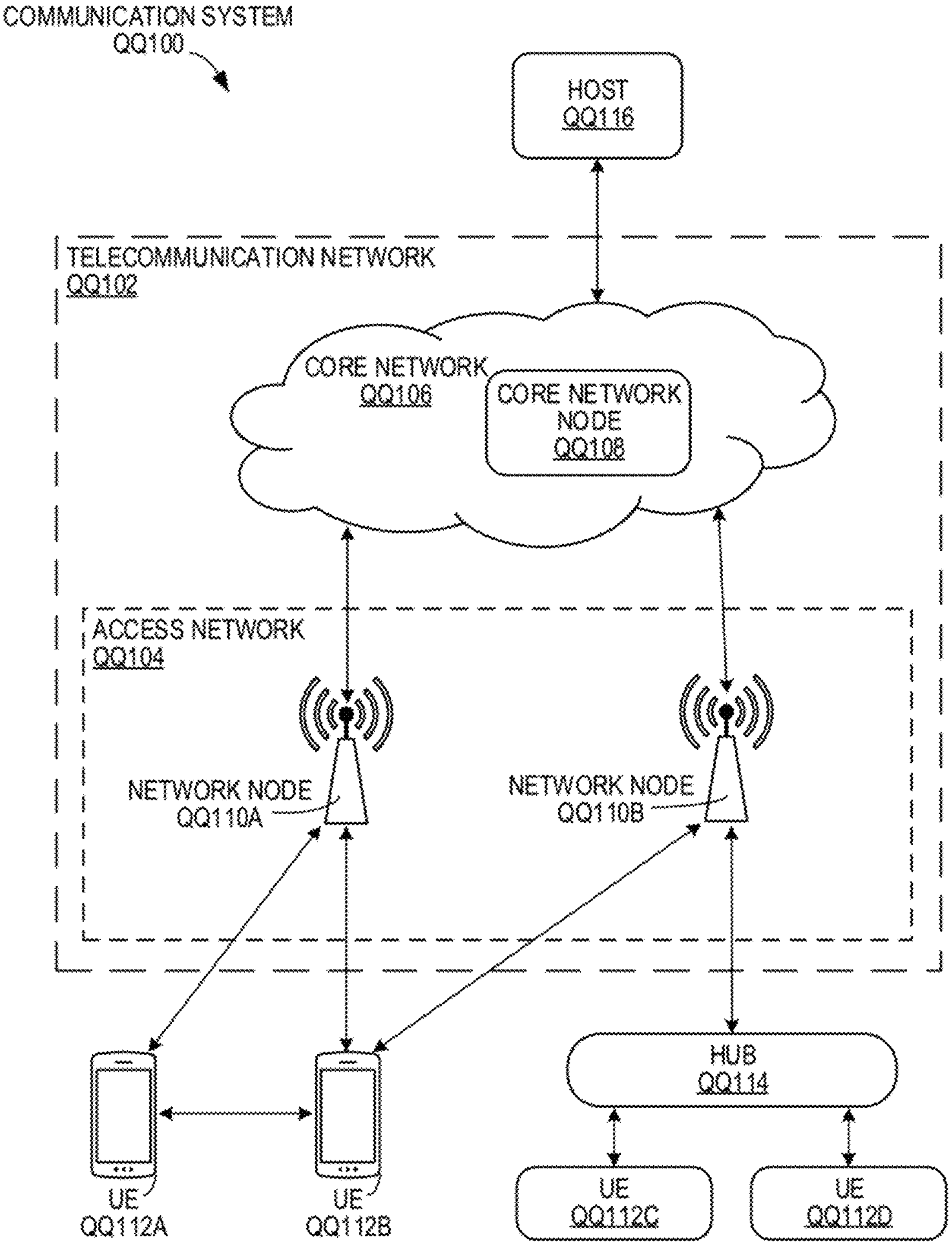
FIG. 3 shows an example of a communication system QQ100 in accordance with some embodiments.

If the average Size of UL data that is transmitted by the UEs is very large, but the percentage of the packets correctly delivered to the network is small, the network node can increase the PUSCH resources allocated for the msgA transmission, but network node can decrease the maximum MCS value associated to the msgA transmission (lower modulation and coding scheme) to increase the robustness of the transmission FIG. 3 shows an example of a communication system QQ100 in accordance with some embodiments.

In the example, the communication system QQ100 includes a telecommunication network QQ102 that includes an access network QQ104, such as a radio access network (RAN), and a core network QQ106, which includes one or more core network nodes QQ108. The access network QQ104 includes one or more access network nodes, such as network nodes QQ110*a* and QQ110*b* (one or more of which may be generally referred to as network nodes QQ110), or any other similar 3rd Generation Partnership Project (3GPP) access node or non-3GPP access point. The network nodes QQ110 facilitate direct or indirect connection of user equipment (UE), such as by connecting UEs QQ112*a*, QQ112*b*, QQ112*c*, and QQ112*d* (one or more of which may be generally referred to as UEs QQ112) to the core network QQ106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system QQ100 may include any number of wired or wireless networks, network nodes, UEs, and/or any other components or systems that may facilitate or participate in the communication of data and/or signals whether via wired or wireless connections. The communication system QQ100 may include and/or interface with any type of communication, telecommunication, data, cellular, radio network, and/or other similar type of system.

The UEs QQ112 may be any of a wide variety of communication devices, including wireless devices arranged, configured, and/or operable to communicate wirelessly with the network nodes QQ110 and other communication devices. Similarly, the network nodes QQ110 are arranged, capable, configured, and/or operable to communicate directly or indirectly with the UEs QQ112 and/or with other network nodes or equipment in the telecommunication network QQ102 to enable and/or provide network access, such as wireless network access, and/or to perform other functions, such as administration in the telecommunication network QQ102.

In the depicted example, the core network QQ106 connects the network nodes QQ110 to one or more hosts, such as host QQ116. These connections may be direct or indirect via one or more intermediary networks or devices. In other examples, network nodes may be directly coupled to hosts. The core network QQ106 includes one more core network nodes (e.g., core network node QQ108) that are structured with hardware and software components. Features of these components may be substantially similar to those described with respect to the UEs, network nodes, and/or hosts, such that the descriptions thereof are generally applicable to the corresponding components of the core network node QQ108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host QQ116 may be under the ownership or control of a service provider other than an operator or provider of the access network QQ104 and/or the telecommunication network QQ102, and may be operated by the service provider or on behalf of the service provider. The host QQ116 may host a variety of applications to provide one or more services.

Examples of such applications include the provision of live and/or pre-recorded audio/video content, data collection services, for example, retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system QQ100 of FIG. 3 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network QQ102 is a cellular network that implements 3GPP standardized features. Accordingly, the telecommunications network QQ102 may support network slicing to provide different logical networks to different devices that are connected to the telecommunication network QQ102. For example, the telecommunications network QQ102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs QQ112 are configured to transmit and/or receive information without direct human interaction. For instance, a UE may be designed to transmit information to the access network QQ104 on a predetermined schedule, when triggered by an internal or external event, or in response to requests from the access network QQ104. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example illustrated in FIG. 3, the hub QQ114 communicates with the access network QQ104 to facilitate indirect communication between one or more UEs (e.g., UE QQ112*c* and/or QQ112*d*) and network nodes (e.g., network node QQ110*b*). In some examples, the hub QQ114 may be a controller, router, a content source and analytics node, or any of the other communication devices described herein regarding UEs. For example, the hub QQ114 may be a broadband router enabling access to the core network QQ106 for the UEs. As another example, the hub QQ114 may be a controller that sends commands or instructions to one or more actuators in the UEs. Commands or instructions may be received from the UEs, network nodes QQ110, or by executable code, script, process, or other instructions in the hub QQ114. As another example, the hub QQ114 may be a data collector that acts as temporary storage for UE data and, in some embodiments, may perform analysis or other processing of the data. As another example, the hub QQ114 may be a content source. For example, for a UE that is a VR headset, display, loudspeaker or other media delivery device, the hub QQ114 may retrieve VR assets, video, audio, or other media or data related to sensory information via a network node, which the hub QQ114 then provides to the UE either directly, after performing local processing, and/or after adding additional local content. In still another example, the hub QQ114 acts as a proxy server or orchestrator for the UEs, in particular in if one or more of the UEs are low energy IoT devices.

The hub QQ114 may have a constant/persistent or intermittent connection to the network node QQ110*b*. The hub QQ114 may also allow for a different communication scheme and/or schedule between the hub QQ114 and UEs (e.g., UE QQ112*c* and/or QQ112*d*), and between the hub QQ114 and the core network QQ106. In other examples, the hub QQ114 is connected to the core network QQ106 and/or one or more UEs via a wired connection. Moreover, the hub QQ114 may be configured to connect to an M2M service provider over the access network QQ104 and/or to another UE over a direct connection. In some scenarios, UEs may establish a wireless connection with the network nodes QQ110 while still connected via the hub QQ114 via a wired or wireless connection. In some embodiments, the hub QQ114 may be a dedicated hub—that is, a hub whose primary function is to route communications to/from the UEs from/to the network node QQ110*b*. In other embodiments, the hub QQ114 may be a non-dedicated hub—that is, a device which is capable of operating to route communications between the UEs and network node QQ110*b*, but which is additionally capable of operating as a communication start and/or end point for certain data channels.

Figure 4:
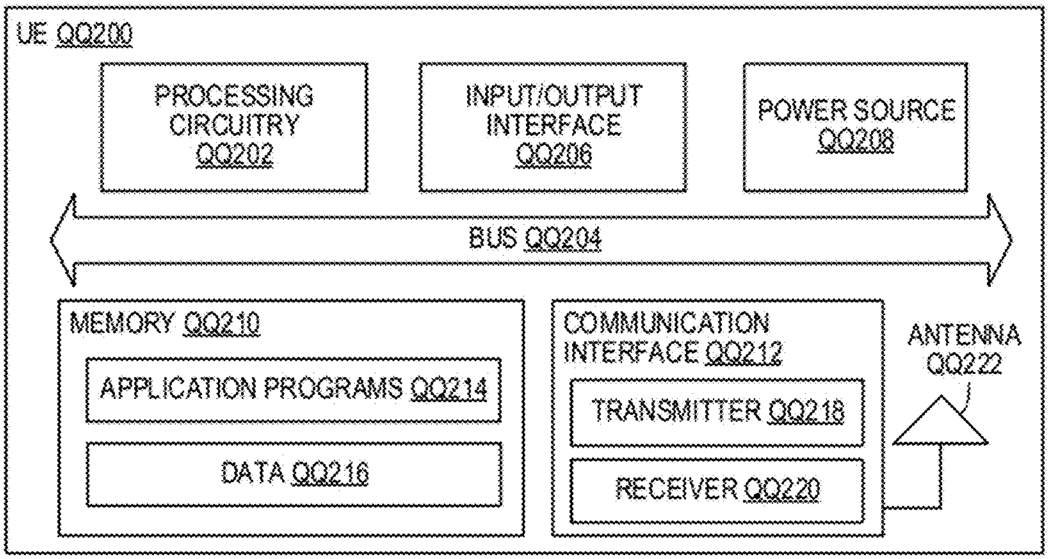
FIG. 4 shows a User Equipment (UE) in accordance with some embodiments.

FIG. 4 shows a UE QQ200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless camera, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE QQ200 includes processing circuitry QQ202 that is operatively coupled via a bus QQ204 to an input/output interface QQ206, a power source QQ208, a memory QQ210, a communication interface QQ212, and/or any other component, or any combination thereof. Certain UEs may utilize all or a subset of the components shown in FIG. 4. The level of integration between the components may vary from one UE to another UE. Further, certain UEs may contain multiple instances of a component, such as multiple processors, memories, transceivers, transmitters, receivers, etc.

The processing circuitry QQ202 is configured to process instructions and data and may be configured to implement any sequential state machine operative to execute instructions stored as machine-readable computer programs in the memory QQ210. The processing circuitry QQ202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry QQ202 may include multiple central processing units (CPUs). The processing circuitry QQ202 may be operable to provide, either alone or in conjunction with other UE QQ200 components, such as the memory QQ210, UE QQ200 functionality. For example, the processing circuitry QQ202 may be configured to cause the UE QQ202 to perform the methods as described with reference to FIG. 1.

In the example, the input/output interface QQ206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE QQ200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source QQ208 is structured as a battery or battery pack. Other types of power sources, such as an external power source (e.g., an electricity outlet), photovoltaic device, or power cell, may be used. The power source QQ208 may further include power circuitry for delivering power from the power source QQ208 itself, and/or an external power source, to the various parts of the UE QQ200 via input circuitry or an interface such as an electrical power cable. Delivering power may be, for example, for charging of the power source QQ208. Power circuitry may perform any formatting, converting, or other modification to the power from the power source QQ208 to make the power suitable for the respective components of the UE QQ200 to which power is supplied.

The memory QQ210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory QQ210 includes one or more application programs QQ214, such as an operating system, web browser application, a widget, gadget engine, or other application, and corresponding data QQ216. The memory QQ210 may store, for use by the UE QQ200, any of a variety of various operating systems or combinations of operating systems.

The memory QQ210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory QQ210 may allow the UE QQ200 to access instructions, application programs and the like, stored on transitory or non-transitory memory media, to off-load data, or to upload data. An article of manufacture, such as one utilizing a communication system may be tangibly embodied as or in the memory QQ210, which may be or comprise a device-readable storage medium.

The processing circuitry QQ202 may be configured to communicate with an access network or other network using the communication interface QQ212. The communication interface QQ212 may comprise one or more communication subsystems and may include or be communicatively coupled to an antenna QQ222. The communication interface QQ212 may include one or more transceivers used to communicate, such as by communicating with one or more remote transceivers of another device capable of wireless communication (e.g., another UE or a network node in an access network). Each transceiver may include a transmitter QQ218 and/or a receiver QQ220 appropriate to provide network communications (e.g., optical, electrical, frequency allocations, and so forth). Moreover, the transmitter QQ218 and receiver QQ220 may be coupled to one or more antennas (e.g., antenna QQ222) and may share circuit components, software or firmware, or alternatively be implemented separately.

In some embodiments, communication functions of the communication interface QQ212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface QQ212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or controls a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are devices which are or which are embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence on the intended application of the IoT device in addition to other components as described in relation to the UE QQ200 shown in FIG. 4.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 5:
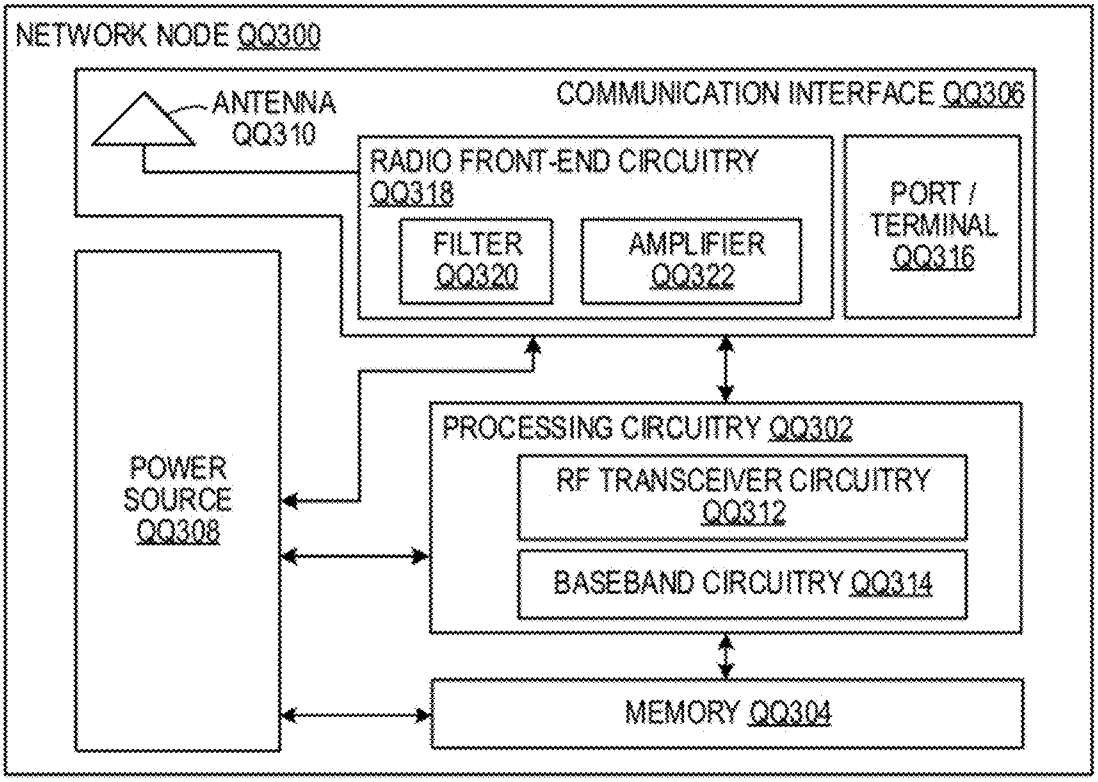
FIG. 5 shows a network node QQ300 in accordance with some embodiments.

FIG. 5 shows a network node QQ300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node QQ300 includes processing circuitry QQ302, a memory QQ304, a communication interface QQ306, and a power source QQ308, and/or any other component, or any combination thereof. The network node QQ300 may be composed of multiple physically separate components (e.g., a NodeB component and a RNC component, or a BTS component and a BSC component, etc.), which may each have their own respective components. In certain scenarios in which the network node QQ300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node QQ300 may be configured to support multiple radio access technologies (RATs). In such embodiments, some components may be duplicated (e.g., separate memory QQ304 for different RATs) and some components may be reused (e.g., a same antenna QQ310 may be shared by different RATs). The network node QQ300 may also include multiple sets of the various illustrated components for different wireless technologies integrated into network node QQ300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node QQ300.

The processing circuitry QQ302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ300 components, such as the memory QQ304, network node QQ300 functionality. For example, the processing circuitry QQ302 may be configured to cause the network node to perform the methods as described with reference to FIG. 2.

In some embodiments, the processing circuitry QQ302 includes a system on a chip (SOC). In some embodiments, the processing circuitry QQ302 includes one or more of radio frequency (RF) transceiver circuitry QQ312 and baseband processing circuitry QQ314. In some embodiments, the radio frequency (RF) transceiver circuitry QQ312 and the baseband processing circuitry QQ314 may be on separate chips (or sets of chips), boards, or units, such as radio units and digital units. In alternative embodiments, part or all of RF transceiver circuitry QQ312 and baseband processing circuitry QQ314 may be on the same chip or set of chips, boards, or units.

The memory QQ304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry QQ302. The memory QQ304 may store any suitable instructions, data, or information, including a computer program, software, an application including one or more of logic, rules, code, tables, and/or other instructions capable of being executed by the processing circuitry QQ302 and utilized by the network node QQ300. The memory QQ304 may be used to store any calculations made by the processing circuitry QQ302 and/or any data received via the communication interface QQ306. In some embodiments, the processing circuitry QQ302 and memory QQ304 is integrated.

The communication interface QQ306 is used in wired or wireless communication of signaling and/or data between a network node, access network, and/or UE. As illustrated, the communication interface QQ306 comprises port(s)/terminal(s) QQ316 to send and receive data, for example to and from a network over a wired connection. The communication interface QQ306 also includes radio front-end circuitry QQ318 that may be coupled to, or in certain embodiments a part of, the antenna QQ310. Radio front-end circuitry QQ318 comprises filters QQ320 and amplifiers QQ322. The radio front-end circuitry QQ318 may be connected to an antenna QQ310 and processing circuitry QQ302. The radio front-end circuitry may be configured to condition signals communicated between antenna QQ310 and processing circuitry QQ302. The radio front-end circuitry QQ318 may receive digital data that is to be sent out to other network nodes or UEs via a wireless connection. The radio front-end circuitry QQ318 may convert the digital data into a radio signal having the appropriate channel and bandwidth parameters using a combination of filters QQ320 and/or amplifiers QQ322. The radio signal may then be transmitted via the antenna QQ310. Similarly, when receiving data, the antenna QQ310 may collect radio signals which are then converted into digital data by the radio front-end circuitry QQ318. The digital data may be passed to the processing circuitry QQ302. In other embodiments, the communication interface may comprise different components and/or different combinations of components.

In certain alternative embodiments, the network node QQ300 does not include separate radio front-end circuitry QQ318, instead, the processing circuitry QQ302 includes radio front-end circuitry and is connected to the antenna QQ310. Similarly, in some embodiments, all or some of the RF transceiver circuitry QQ312 is part of the communication interface QQ306. In still other embodiments, the communication interface QQ306 includes one or more ports or terminals QQ316, the radio front-end circuitry QQ318, and the RF transceiver circuitry QQ312, as part of a radio unit (not shown), and the communication interface QQ306 communicates with the baseband processing circuitry QQ314, which is part of a digital unit (not shown).

The antenna QQ310 may include one or more antennas, or antenna arrays, configured to send and/or receive wireless signals. The antenna QQ310 may be coupled to the radio front-end circuitry QQ318 and may be any type of antenna capable of transmitting and receiving data and/or signals wirelessly. In certain embodiments, the antenna QQ310 is separate from the network node QQ300 and connectable to the network node QQ300 through an interface or port.

The antenna QQ310, communication interface QQ306, and/or the processing circuitry QQ302 may be configured to perform any receiving operations and/or certain obtaining operations described herein as being performed by the network node. Any information, data and/or signals may be received from a UE, another network node and/or any other network equipment. Similarly, the antenna QQ310, the communication interface QQ306, and/or the processing circuitry QQ302 may be configured to perform any transmitting operations described herein as being performed by the network node. Any information, data and/or signals may be transmitted to a UE, another network node and/or any other network equipment.

The power source QQ308 provides power to the various components of network node QQ300 in a form suitable for the respective components (e.g., at a voltage and current level needed for each respective component). The power source QQ308 may further comprise, or be coupled to, power management circuitry to supply the components of the network node QQ300 with power for performing the functionality described herein. For example, the network node QQ300 may be connectable to an external power source (e.g., the power grid, an electricity outlet) via an input circuitry or interface such as an electrical cable, whereby the external power source supplies power to power circuitry of the power source QQ308. As a further example, the power source QQ308 may comprise a source of power in the form of a battery or battery pack which is connected to, or integrated in, power circuitry. The battery may provide backup power should the external power source fail.

Embodiments of the network node QQ300 may include additional components beyond those shown in FIG. 5 for providing certain aspects of the network node's functionality, including any of the functionality described herein and/or any functionality necessary to support the subject matter described herein. For example, the network node QQ300 may include user interface equipment to allow input of information into the network node QQ300 and to allow output of information from the network node QQ300. This may allow a user to perform diagnostic, maintenance, repair, and other administrative functions for the network node QQ300.

Figure 6:
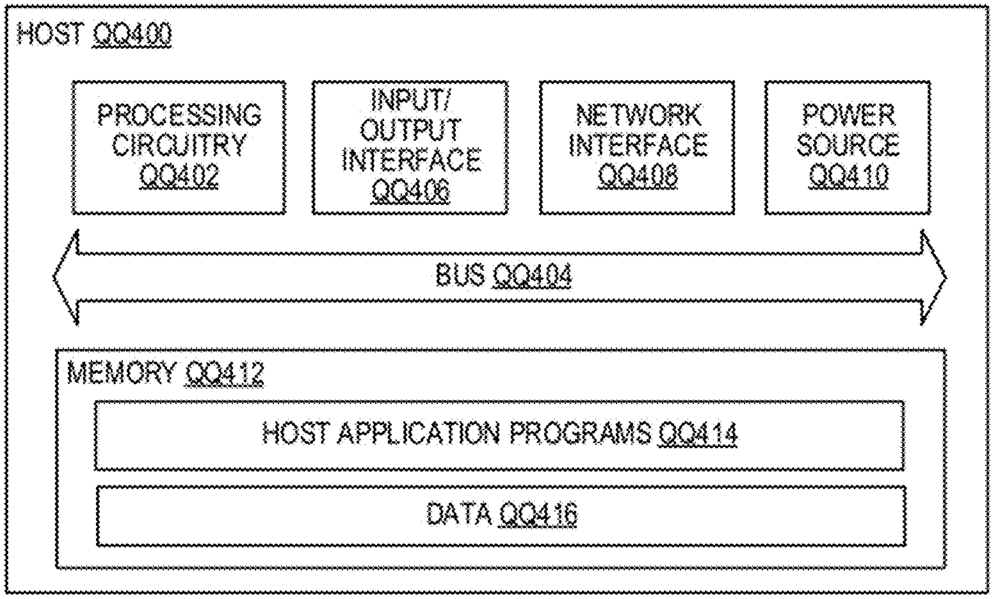
FIG. 6 is a block diagram of a host in accordance with various aspects described herein.

FIG. 6 is a block diagram of a host QQ400, which may be an embodiment of the host QQ116 of FIG. 3, in accordance with various aspects described herein. As used herein, the host QQ400 may be or comprise various combinations hardware and/or software, including a standalone server, a blade server, a cloud-implemented server, a distributed server, a virtual machine, container, or processing resources in a server farm. The host QQ400 may provide one or more services to one or more UEs.

The host QQ400 includes processing circuitry QQ402 that is operatively coupled via a bus QQ404 to an input/output interface QQ406, a network interface QQ408, a power source QQ410, and a memory QQ412. Other components may be included in other embodiments. Features of these components may be substantially similar to those described with respect to the devices of previous figures, such as FIGS. 4 and 5, such that the descriptions thereof are generally applicable to the corresponding components of host QQ400.

The memory QQ412 may include one or more computer programs including one or more host application programs QQ414 and data QQ416, which may include user data, e.g., data generated by a UE for the host QQ400 or data generated by the host QQ400 for a UE. Embodiments of the host QQ400 may utilize only a subset or all of the components shown. The host application programs QQ414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs QQ414 may also provide for user authentication and licensing checks and may periodically report health, routes, and content availability to a central node, such as a device in or on the edge of a core network. Accordingly, the host QQ400 may select and/or indicate a different host for over-the-top services for a UE. The host application programs QQ414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 7:
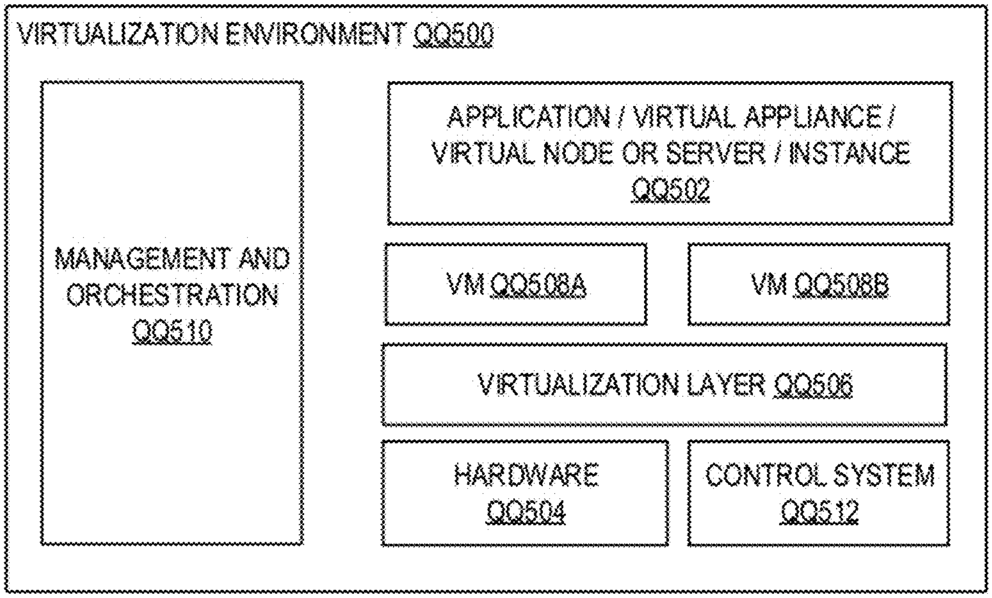
FIG. 7 is a block diagram illustrating a virtualization environment in which functions implemented by some embodiments may be virtualized.

FIG. 7 is a block diagram illustrating a virtualization environment QQ500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments QQ500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications QQ502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware QQ504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers QQ506 (also referred to as hypervisors or virtual machine monitors (VMMs)), provide VMs QQ508*a* and QQ508*b* (one or more of which may be generally referred to as VMs QQ508), and/or perform any of the functions, features and/or benefits described in relation with some embodiments described herein. The virtualization layer QQ506 may present a virtual operating platform that appears like networking hardware to the VMs QQ508.

The VMs QQ508 comprise virtual processing, virtual memory, virtual networking or interface and virtual storage, and may be run by a corresponding virtualization layer QQ506. Different embodiments of the instance of a virtual appliance QQ502 may be implemented on one or more of VMs QQ508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM QQ508 may be a software implementation of a physical machine that runs programs as if they were executing on a physical, non-virtualized machine. Each of the VMs QQ508, and that part of hardware QQ504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs QQ508 on top of the hardware QQ504 and corresponds to the application QQ502.

Hardware QQ504 may be implemented in a standalone network node with generic or specific components. Hardware QQ504 may implement some functions via virtualization. Alternatively, hardware QQ504 may be part of a larger cluster of hardware (e.g. such as in a data center or CPE) where many hardware nodes work together and are managed via management and orchestration QQ510, which, among others, oversees lifecycle management of applications QQ502. In some embodiments, hardware QQ504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system QQ512 which may alternatively be used for communication between hardware nodes and radio units.

Figure 8:
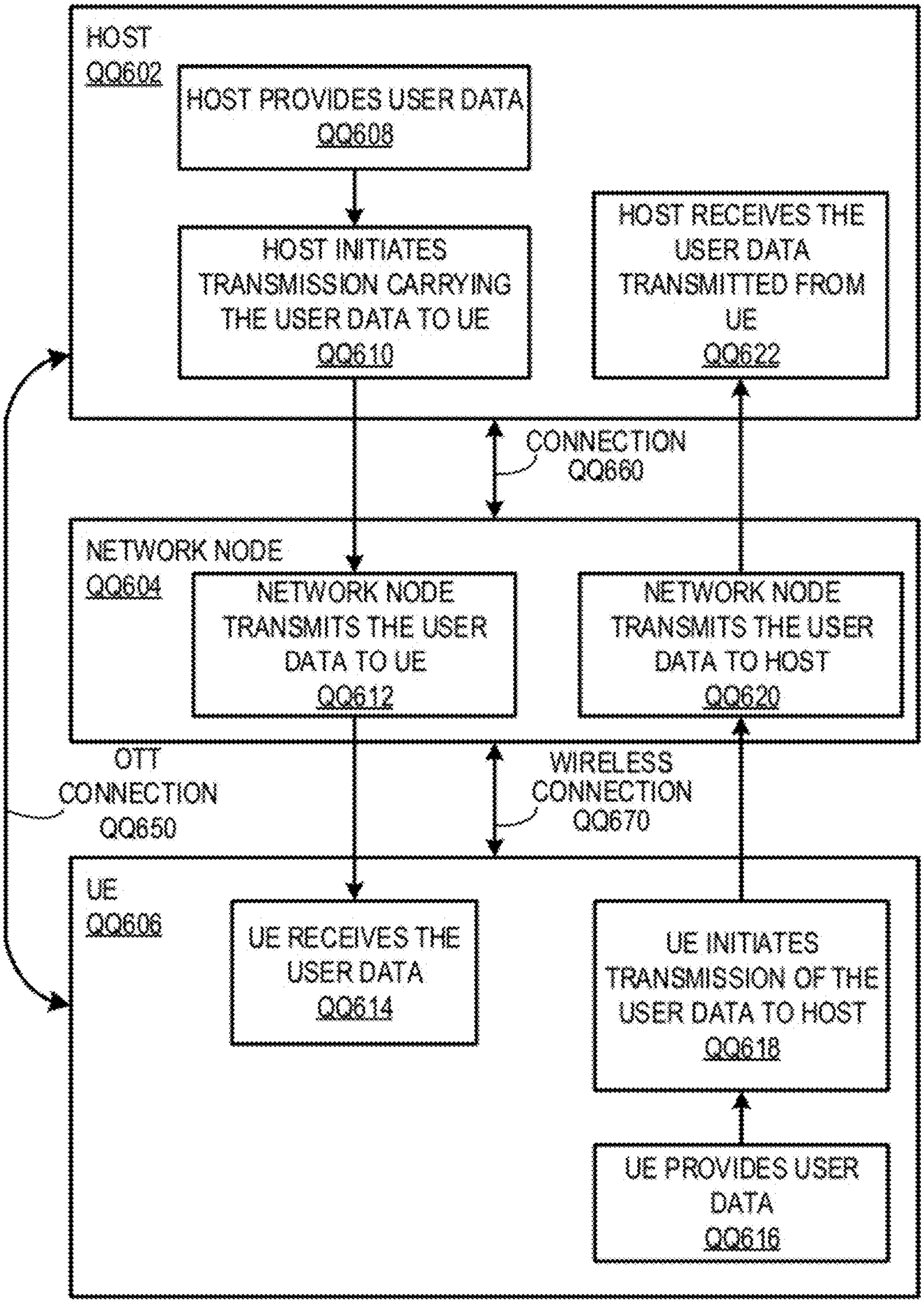
FIG. 8 shows a communication diagram of a host communicating via a network node with a UE over a partially wireless connection in accordance with some embodiments.

FIG. 8 shows a communication diagram of a host QQ602 communicating via a network node QQ604 with a UE QQ606 over a partially wireless connection in accordance with some embodiments. Example implementations, in accordance with various embodiments, of the UE (such as a UE QQ112*a* of FIG. 3 and/or UE QQ200 of FIG. 4), network node (such as network node QQ110*a* of FIG. 3 and/or network node QQ300 of FIG. 5), and host (such as host QQ116 of FIG. 3 and/or host QQ400 of FIG. 6) discussed in the preceding paragraphs will now be described with reference to FIG. 8.

Like host QQ400, embodiments of host QQ602 include hardware, such as a communication interface, processing circuitry, and memory. The host QQ602 also includes software, which is stored in or accessible by the host QQ602 and executable by the processing circuitry. The software includes a host application that may be operable to provide a service to a remote user, such as the UE QQ606 connecting via an over-the-top (OTT) connection QQ650 extending between the UE QQ606 and host QQ602. In providing the service to the remote user, a host application may provide user data which is transmitted using the OTT connection QQ650.

The network node QQ604 includes hardware enabling it to communicate with the host QQ602 and UE QQ606. The connection QQ660 may be direct or pass through a core network (like core network QQ106 of FIG. 3) and/or one or more other intermediate networks, such as one or more public, private, or hosted networks. For example, an intermediate network may be a backbone network or the Internet.

The UE QQ606 includes hardware and software, which is stored in or accessible by UE QQ606 and executable by the UE's processing circuitry. The software includes a client application, such as a web browser or operator-specific "app" that may be operable to provide a service to a human or non-human user via UE QQ606 with the support of the host QQ602. In the host QQ602, an executing host application may communicate with the executing client application via the OTT connection QQ650 terminating at the UE QQ606 and host QQ602. In providing the service to the user, the UE's client application may receive request data from the host's host application and provide user data in response to the request data. The OTT connection QQ650 may transfer both the request data and the user data. The UE's client application may interact with the user to generate the user data that it provides to the host application through the OTT connection QQ650.

The OTT connection QQ650 may extend via a connection QQ660 between the host QQ602 and the network node QQ604 and via a wireless connection QQ670 between the network node QQ604 and the UE QQ606 to provide the connection between the host QQ602 and the UE QQ606. The connection QQ660 and wireless connection QQ670, over which the OTT connection QQ650 may be provided, have been drawn abstractly to illustrate the communication between the host QQ602 and the UE QQ606 via the network node QQ604, without explicit reference to any intermediary devices and the precise routing of messages via these devices.

As an example of transmitting data via the OTT connection QQ650, in step QQ608, the host QQ602 provides user data, which may be performed by executing a host application. In some embodiments, the user data is associated with a particular human user interacting with the UE QQ606. In other embodiments, the user data is associated with a UE QQ606 that shares data with the host QQ602 without explicit human interaction. In step QQ610, the host QQ602 initiates a transmission carrying the user data towards the UE QQ606. The host QQ602 may initiate the transmission responsive to a request transmitted by the UE QQ606. The request may be caused by human interaction with the UE QQ606 or by operation of the client application executing on the UE QQ606. The transmission may pass via the network node QQ604, in accordance with the teachings of the embodiments described throughout this disclosure. Accordingly, in step QQ612, the network node QQ604 transmits to the UE QQ606 the user data that was carried in the transmission that the host QQ602 initiated, in accordance with the teachings of the embodiments described throughout this disclosure. In step QQ614, the UE QQ606 receives the user data carried in the transmission, which may be performed by a client application executed on the UE QQ606 associated with the host application executed by the host QQ602.

In some examples, the UE QQ606 executes a client application which provides user data to the host QQ602. The user data may be provided in reaction or response to the data received from the host QQ602. Accordingly, in step QQ616, the UE QQ606 may provide user data, which may be performed by executing the client application. In providing the user data, the client application may further consider user input received from the user via an input/output interface of the UE QQ606. Regardless of the specific manner in which the user data was provided, the UE QQ606 initiates, in step QQ618, transmission of the user data towards the host QQ602 via the network node QQ604. In step QQ620, in accordance with the teachings of the embodiments described throughout this disclosure, the network node QQ604 receives user data from the UE QQ606 and initiates transmission of the received user data towards the host QQ602. In step QQ622, the host QQ602 receives the user data carried in the transmission initiated by the UE QQ606.

One or more of the various embodiments improve the performance of OTT services provided to the UE QQ606 using the OTT connection QQ650, in which the wireless connection QQ670 forms the last segment. More precisely, the teachings of these embodiments may improve the information provided in random access reports and thereby provide benefits such as improved random access procedures in some examples.

In an example scenario, factory status information may be collected and analyzed by the host QQ602. As another example, the host QQ602 may process audio and video data which may have been retrieved from a UE for use in creating maps. As another example, the host QQ602 may collect and analyze real-time data to assist in controlling vehicle congestion (e.g., controlling traffic lights). As another example, the host QQ602 may store surveillance video uploaded by a UE. As another example, the host QQ602 may store or control access to media content such as video, audio, VR or AR which it can broadcast, multicast or unicast to UEs. As other examples, the host QQ602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection QQ650 between the host QQ602 and UE QQ606, in response to variations in the measurement results. The measurement procedure and/or the network functionality for reconfiguring the OTT connection may be implemented in software and hardware of the host QQ602 and/or UE QQ606. In some embodiments, sensors (not shown) may be deployed in or in association with other devices through which the OTT connection QQ650 passes; the sensors may participate in the measurement procedure by supplying values of the monitored quantities exemplified above, or supplying values of other physical quantities from which software may compute or estimate the monitored quantities. The reconfiguring of the OTT connection QQ650 may include message format, retransmission settings, preferred routing etc.; the reconfiguring need not directly alter the operation of the network node QQ604. Such procedures and functionalities may be known and practiced in the art. In certain embodiments, measurements may involve proprietary UE signaling that facilitates measurements of throughput, propagation times, latency and the like, by the host QQ602. The measurements may be implemented in that software causes messages to be transmitted, in particular empty or 'dummy' messages, using the OTT connection QQ650 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

The invention claimed is:

1. A method performed by a user equipment, UE, for sending a report, the method comprising:

sending a random access, RA, report to a network node, wherein the RA report includes an indication of a size of data in an uplink data buffer of the UE on initiation of a random access, RA, procedure performed by the UE, and wherein the indication of the size of the data in the uplink data buffer comprises an indication of a sum of a size of uplink data transmitted in a physical uplink shared channel, PUSCH, transmission associated with the RA procedure and a size of data remaining in the uplink data buffer after completion of the RA procedure.

2. The method of claim 1, wherein the indication of the size of the data in the uplink buffer comprises an indication of one of a plurality of predetermined ranges for the size of the data.

3. The method of claim 2, wherein the indication of one of the plurality of predetermined ranges for the size of the data comprises an indication of an index in a table.

4. The method of claim 1, wherein the RA report is comprised in a UE Information Response message.

5. The method of claim 1, wherein the PUSCH transmission associated with the RA procedure comprises a PUSCH transmission transmitted in PUSCH resources allocated to the UE in the RA procedure.

6. The method of claim 1, comprising receiving a request for a RA report from the network node before sending the RA report to the network node.

7. The method of claim 1, wherein the RA procedure comprises a 2-step RA procedure.

8. The method of claim 1, wherein the RA procedure comprises a successful RA procedure.

9. A method performed by a network node for receiving a report, the method comprising:

receiving a random access, RA, report from a User Equipment, UE, wherein the RA report includes an indication of a size of data in an uplink data buffer of the UE on initiation of a random access, RA, procedure performed by the UE and wherein the indication of the size of the data in the uplink data buffer comprises an indication of a sum of a size of uplink data transmitted in a physical uplink shared channel, PUSCH, transmission associated with the RA procedure and a size of data remaining in the uplink data buffer after completion of the RA procedure.

10. The method of claim 9, wherein the indication of the size of the data in the uplink data buffer comprises an indication of one of a plurality of predetermined ranges for the size of the data.

11. The method of claim 10, wherein the indication of one of the plurality of predetermined ranges for the size of the data comprises an indication of an index in a table.

12. The method of claim 9, wherein the RA report is comprised in a UE Information Response message.

13. The method of claim 9, comprising sending a request for a RA report to the UE before receiving the RA report from the UE.

14. The method of claim 9, wherein the RA procedure comprises a 2-step RA procedure.

15. The method of claim 9, wherein the RA procedure comprises a successful RA procedure.

16. The method of claim 9, comprising adapting one or more parameters for a random access channel, RACH, and/or a physical uplink shared channel, PUSCH, for one or more further RA procedures for the UE and/or one or more other UEs based on the indication of the size of the data in the uplink data buffer.

17. A user equipment, UE, for sending a report, the UE comprising a processor and a memory, the memory containing instructions executable by the processor such that the UE is operable to:

send a random access, RA, report to a network node, wherein the RA report includes an indication of a size of data in an uplink data buffer of the UE on initiation of a random access, RA, procedure performed by the UE, and wherein the indication of the size of the data in the uplink data buffer comprises an indication of a sum of a size of uplink data transmitted in a physical uplink shared channel, PUSCH, transmission associated with the RA procedure and a size of data remaining in the uplink data buffer after completion of the RA procedure.

18. A network node for receiving a report, the network node comprising a processor and a memory, the memory containing instructions executable by the processor such that the network node is operable to:

receive a random access, RA, report from a User Equipment, UE, wherein the RA report includes an indication of a size of data in an uplink data buffer of the UE on initiation of a random access, RA, procedure performed by the UE and wherein the indication of the size of the data in the uplink data buffer comprises an indication of a sum of a size of uplink data transmitted in a physical uplink shared channel, PUSCH, transmission associated with the RA procedure and a size of data remaining in the uplink data buffer after completion of the RA procedure.

* * * * *